United States Patent [19]

Kemnitz

[11] Patent Number: 4,630,696
[45] Date of Patent: Dec. 23, 1986

[54] APPARATUS AND METHOD FOR AUTOMATIC SYSTEM CALIBRATION TO PROVIDE ENHANCED RESOLUTION IN COMPUTERIZED WEIGHING SYSTEMS

[75] Inventor: Tadeusz F. Kemnitz, Chapel Hill, N.C.

[73] Assignee: Azionaria Costruzioni Macchine Automatiche, Bologna, Italy

[21] Appl. No.: 791,322

[22] Filed: Oct. 25, 1985

[51] Int. Cl.⁴ .................. G01G 13/14; G01G 19/22
[52] U.S. Cl. .................................. 177/165; 177/1; 177/25
[58] Field of Search ........................... 177/1, 25, 165

[56] References Cited

U.S. PATENT DOCUMENTS

| | | |
|---|---|---|
| 3,557,889 | 1/1971 | Rejsa . |
| 3,708,025 | 1/1973 | Soler et al. . |
| 3,939,928 | 2/1976 | Murakami et al. . |
| 4,206,822 | 6/1980 | Mazzucchelli . |
| 4,308,928 | 1/1982 | Oshima . |
| 4,344,492 | 8/1982 | Hirano ........................... 177/165 X |
| 4,423,585 | 1/1984 | Monsees et al. . |
| 4,442,911 | 4/1984 | Fukuda ............................. 177/165 |
| 4,465,149 | 8/1984 | Kawashima et al. .......... 177/165 X |

*Primary Examiner*—George H. Miller, Jr.
*Attorney, Agent, or Firm*—Alan N. McCartney

[57] ABSTRACT

An apparatus and method for calibrating an automatic weighing machine is provided, having means for maintaining the value of an electronic signal indicative of tare weight within a predetermined range of an ideal value in order to ensure adequate signal range is available for high resolution of net weight. In addition, an analog-to-digital (A/D) converter having an adjustable gain is provided which interfaces the analog signal indicative of total gross weight (tare plus net) to a processor means. Means are provided within the processor means for adjusting the gain of the A/D converter in response to changes in the selected target weight for a package of product. Since the range of analog signals indicative of total weight depend on the selected target weight, the gain is adjusted in response to a change in target weight so the full range of digital values remain responsive to the range of analog signals.

16 Claims, 9 Drawing Figures

APPARATUS AND METHOD FOR AUTOMATIC SYSTEM CALIBRATION TO PROVIDE ENHANCED RESOLUTION IN COMPUTERIZED WEIGHING SYSTEMS

TECHNICAL FIELD

This invention relates generally to apparatus and methods for weighing products and, more particularly, to computerized scales for weighing products just prior to packaging by an automatic packaging machine.

BACKGROUND

In general, a computerized scale of the foregoing type includes a series (e.g., ten) of so-called weighing buckets, each associated with an underlying load cell or other means for producing an electrical signal representative of the weight of product in the bucket. Located above each weighing bucket is a holding bucket which contains a quantity of the product to be packaged. During each cycle, each empty weighing bucket is filled with product by momentarily opening the overlying holding bucket and allowing the product to fall into the weighing bucket. The weight of the product dropped into each weighing bucket is substantially less than the total weight of product which subsequently is placed in each package by the packaging machine.

After all of the weighing buckets have been filled, microprocessor-based control circuitry responds to the weight signals produced by the different load cells, adds the weights in various combinations of weighing buckets and then selects the particular combination of buckets that meets the minimum statistical weight for the package to be filled while providing the least excess weight. The weighing buckets of that particular combination are emptied and the product therein is delivered to the packaging machine to be deposited in the package. Only those weighing buckets previously emptied are refilled by dumping from their respective holding buckets during the succeeding cycle.

Because of product buildup and other well-known problems, the tare weights of the weighing buckets may change over a number of weighing cycles. In order to compensate for dynamic changes in the tare weights of the weighing buckets, new tare weights must be periodically calculated.

One example of a method to accomplish a tare weight calculation is disclosed in U.S. patent application Ser. No. 742,553 to Moran, assigned to the assignee of the present invention. In the Moran application, the sequence of weighing cycles is periodically interrupted in order that a tare cycle may be executed. During the tare cycle, all the weighing buckets of the weighing machine which were emptied in the last weighing cycle are weighed in their empty state. The new values for the tare weights are stored and the old values are discarded. By introducing a tare cycle between successive weighing cycles, all weighing buckets are available in each weighing cycle for finding the best combination.

After repeated weighing cycles, it may be required to replace some parts of the apparatus such as the load cells and/or weighing buckets. After maintenance work has been completed, the electrical voltage indicative of the weight of a bucket may be significantly different than the voltage before the repair. For example, each new load cell may not have exactly the same electrical characteristics as the load cell it replaces; therefore, resolution of the net weight placed in the bucket during a weighing cycle may be decreased if the voltage signal from the load cell for an empty bucket is significantly more than it was previously. Manual calibration of the system after each occurrence of a part replacement requires considerable system "down time" and as such represents a significant expense as measured in lost packaging time and reduced productivity.

In addition to lost resolution resulting from component changes, dynamic changes in the tare weights over many weighing cycles may substantially affect the dynamic range, and therefore the resolution, of the load cells and their associated electronics. For example, after repeated weighing and tare cycles for a particular product, a weighing bucket may build up a residue of product which increases the tare weight of the bucket beyond an acceptable value for maintaining good resolution of net weight. In addition, lesser changes in the effective tare weight may be caused by drifting output voltages as a result of the exposure of the electronics to extreme ambient temperatures. For some products and for some environments, these changes in the tare weights may be significant.

As voltage values for the tare weights of the weighing buckets increase, the resolution of the net weights of the products by the computerized scale decreases. With decreased resolution, the scale is less able to determine the best combination of weights. Although the effect of the reduced resolution may be insignificant over a few packaging cycles, the cumulative effect of the reduced resolution is great when considered over a longer work cycle such as a few days, weeks or months.

SUMMARY OF THE INVENTION

It is a general object of the invention to provide a combination weighing device of increased weighing accuracy. In this connection, it is an object of the invention to provide for automatic calibration of a combination weighing device so as to maximize weight resolution and thereby increase weighing accuracy.

It is also an object of the invention to provide for the automatic updating of tare weights in a manner to insure resolution of net weight is not significantly degraded during normal operation.

It is a specific object of the invention to provide an apparatus for calibrating an automatic weighing machine having a plurality of buckets for receiving quantities of product to be packaged and having an adjustable weighing device associated with each bucket for providing a signal whose characteristics are indicative of the total weight of the bucket (tare weight) and the product it holds (net weight). A processor and associated electronic means are provided for adjusting the signal from the adjustable weighing device indicative of tare weight so as to maintain the tare weight signal at a value close to an ideal value. By maintaining the tare weight value of the signal from the adjustable weighing device at a value close to the ideal value, the range of signal values remaining for measuring net weight is maintained at a high level, thereby guaranteeing a high resolution of the net weight. When the tare weight value of the signal from the adjustable weighing device cannot be brought within a predetermined range of an ideal tare weight value, the resolution of net weight is too little and the invention provides for alarming the operator of the weighing machine of a tare weight signal which is out of range and not capable of adjustment.

In keeping with the invention, adjustment means are provided for adjusting the gain of a digital device in response to changes in the magnitude of the target weight for a package of product. The digital device receives analog signals from the adjustable weighing device and converts the analog signals to digital signals for processing by the processor. When the target weight is relatively small, each bucket contains only a relatively light weight amount of product. Accordingly, the corresponding analog voltage from the adjustable weighing device varies over a range of small voltages corresponding to this light weight. To make the digital converter function over its full range of values and thereby maximize the resolution of the net weight carried by each bucket, the adjustment means responds to a change in target weight by changing the gain of the digital converter so the gain of the converter allows the range of analog voltage input to the converter to correspond to the full range of digital values output from the converter.

Other objects and advantages of the invention will be apparent from the following detailed description and the accompanying drawings.

Figure 1:
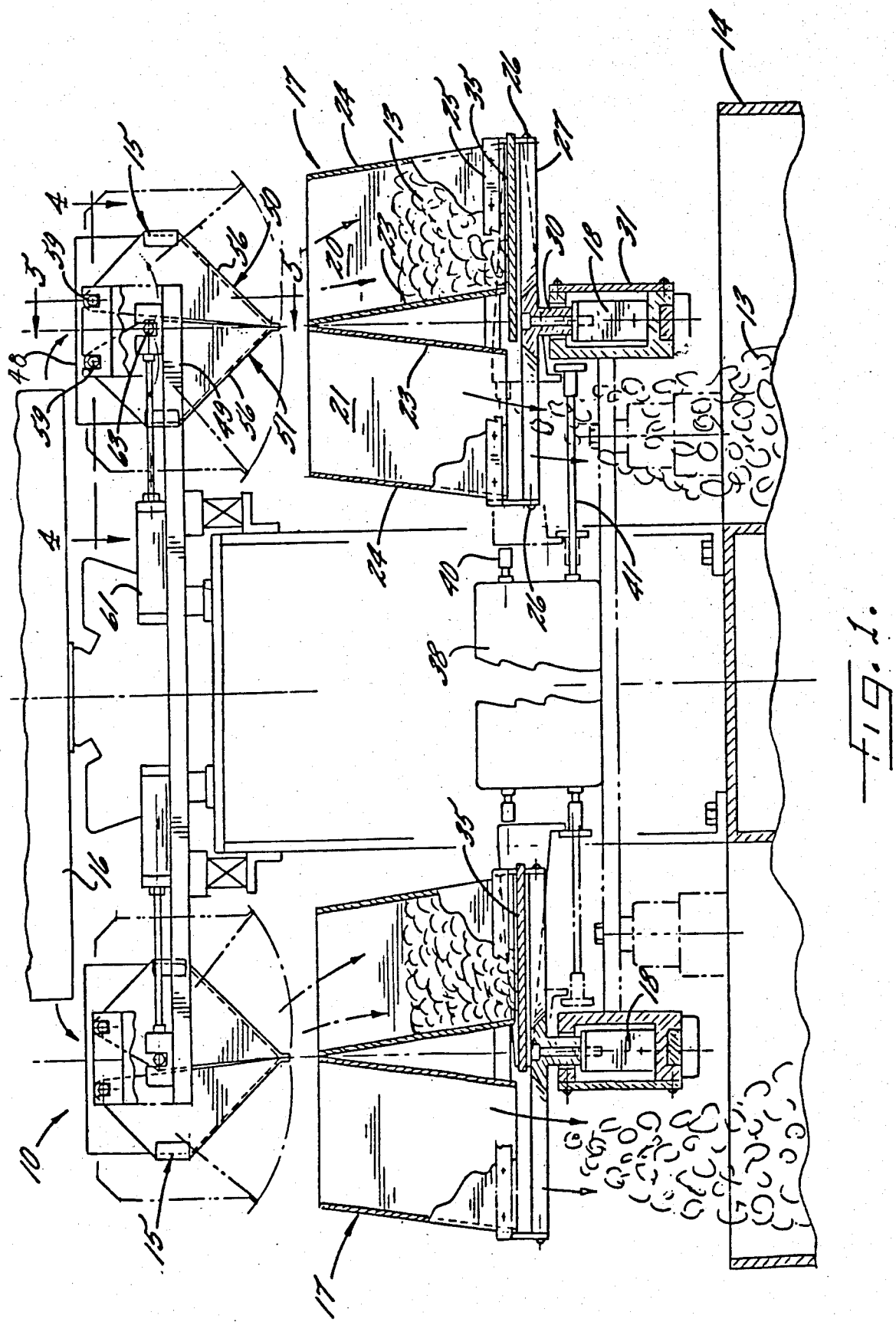
FIG. 1 is an elevational view of a weighing apparatus for use in conjunction with the method of the present invention, certain parts being broken away and shown in section.

While the invention is susceptible of various modifications and alternative constructions, the invention is shown in the drawings and herein described in detail with reference to the preferred embodiment, but it is to be understood that the invention is not intended to be limited to the specific form disclosed. On the contrary, it is intended here to cover all modifications and alternative constructions falling within the spirit and scope of the invention as expressed in the appended claims.

DETAILED DESCRIPTION OF THE PREFERRED EMBODIMENT

Turning first to FIG. 1, the invention is preferably practiced in association with the apparatus 10 for weighing product 13 prior to delivery of the product to the filling funnel 14 of an automatic packaging machine of the type disclosed, for example, in Monsees et al. U.S. Pat. No. 4,423,585. The product may be a snack food such as potato chips which are separated into batches, weighed and then delivered through the funnel and deposited into packages made automatically by the packaging machine (not shown).

The weighing apparatus 10 which has been specifically shown forms part of a computerized scale which weighs the product 13 and insures that the batch of product deposited in each package always meets a specified minimum or target weight while exceeding that weight by as little as practically possible. In general, the weighing apparatus 10 includes metering means in the form of upwardly opening holding buckets 15 adapted to contain product received from an overhead supply which has been indicated schematically at 16. The holding buckets are periodically opened and drop a quantity of product into underlying weighing buckets 17 which rest on load cells 18 or other force-to-electrical signal transducers. The signal produced by each load cell 18 is representative of the weight of the product in the overlying bucket 17.

FIG. 1 shows two groups of holding buckets 15, weighing buckets 17 and load cells 18, there being one group shown at each side of the funnel 14 so that each weighing bucket may drop its product into the funnel after the product has been weighed. Additional groups of holding buckets 15 (not shown) are located at each side of the funnel 14 and thus the overall scale includes a total of N groups with the weight signal from each of the N load cells 18 being transmitted to the microprocessor-based system 100 of FIG. 2 for processing in accordance with the steps of the flowchart in FIGS. 3a and 3b. A typical scale includes eight additional groups of holding buckets 15 that total to ten groups and, correspondingly, ten load cells.

The weight of the product deposited in each weighing bucket 17 from its overlying holding bucket 15 is only a fraction of the total weight of the product with which each package is ultimately to be filled. For example, approximately three ounces of product may be dropped into each weighing bucket while the target weight to be loaded into each package may be fourteen ounces of product.

After all of the weighing buckets 17 have received product 13, the microprocessor-based system 100 adds all possible combinations of the weights represented by the signals from the load cells 18 and selects the best combination of weights to meet the target package weight while minimizing overfilling. The microprocessor-based system 100 then produces a signal to cause emptying of those particular weighing buckets 17 which make up the selected combination. The emptied buckets 17 are refilled and the cycle repeated. In a given cycle, for example, the system may cause a number M of the weighing buckets 17 to empty into the funnel 14 while the remaining N-M buckets remain filled until selected and emptied during subsequent cycles. With each weighing bucket 17 formed by two generally upright and side-by-side compartments or containers 20 and 21, a bucket can be dumped and filled simultaneously.

In order to provide for simultaneous dumping and filling of a weighing bucket 17, a door 35 is mounted to shuttle back and forth beneath the lower ends of the containers 20 and 21 of each weighing bucket. When the door is in one position, it closes the container 20 and opens the container 21 as shown at the right-hand side of FIG. 1. When the door is shifted to its other position, it opens the container 20 and closes the container 21 (see the left-hand side of FIG. 1).

In the present instance, the door 35 is mounted for back and forth horizontal shifting between its two positions by two spaced guide rods (not shown) secured to and located beneath the frame 25. Shifting of the door 35 between its positions is effected by mechanism 38 which de-couples from the door during the weighing portion of the cycle so that the accuracy of the weigh signal will not be affected by the shifting mechanism 38 and vibrations therein. The shifting mechanism 38 includes an upper and normally retracted reciprocating rod 40 and a lower and normally extended reciprocating rod 41, there being pneumatic cylinders (not shown) included in the shifting mechanism 38 for reciprocating the rods.

Figure 2:
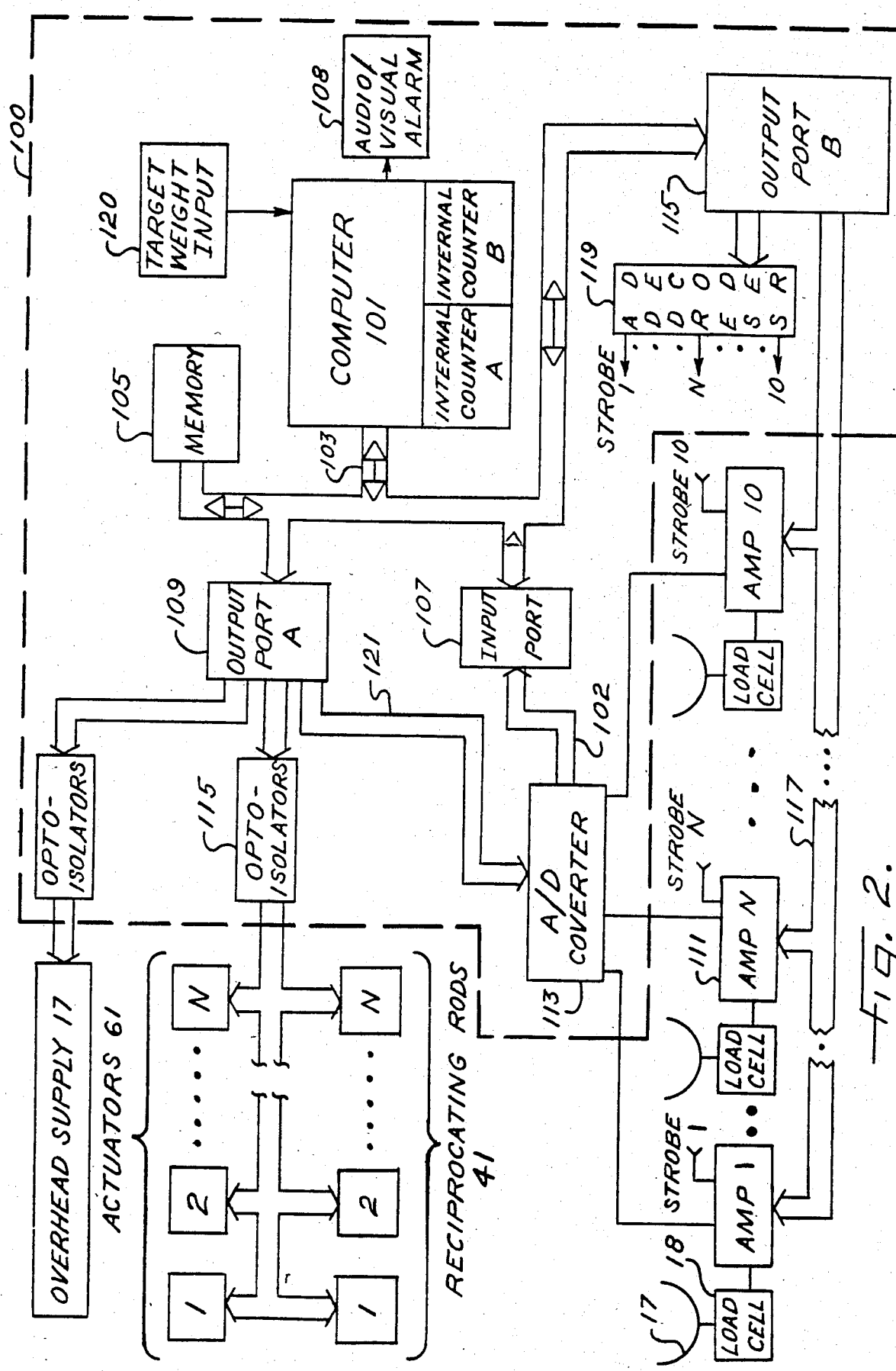
FIG. 2 is a schematic diagram of the microprocessor-based system for controlling the weighing apparatus of FIG. 1 in accordance with the apparatus and method of the invention.

In the microprocessor-based system 100 of FIG. 2, a microprocessor 101 receives, by way of data bus line 102, digital signals from the load cells 18 (shown in FIG. 1) which represent weights from each of the N buckets comprising the weighing apparatus 10. The microprocessor 101 subtracts a tare weight stored in memory 105 from each measured weight in order to provide a net weight which is indicative of only the weight of the product in the corresponding bucket 17. In a conventional manner, a bidirectional bus 103 connects the microprocessor 101 with the memory 105 in order that the data representative of the tare weight for each of the buckets 17 may be retrieved from the memory. Of course, the memory 105 also provides storage for other data related to system operation as is conventional practice in programming microprocessor-based systems such as the one illustrated in FIG. 2. The microprocessor 101 may, for example, be a Z80 microprocessor manufactured by Zilog Inc.

From the data representative of the net weight for each of the buckets 17, the microprocessor 101 calculates combinations of the net weights in search of a total weight which exceeds the target weight by the smallest amount. When the best combination weight is found and when the combination weight is less than a predetermined maximum weight, the microprocessor 101 generates a dump signal for energizing the actuators 61 and reciprocating rods 41 corresponding to the M buckets 17 of the selected combination, thereby dumping the best weight of product 13 into the funnel 14.

When the dump signal is produced by the microprocessor 101, the mechanism 38 causes the door of each weighing bucket in the selected combination 35 to shift from right to left (in the right-hand weighing bucket as viewed in FIG. 1) toward a position opening the container 20 and closing the container 21. At substantially the same time the door 35 begins moving, the dump signal causes the actuator 61 to begin opening a clamshell 51 of the associated holding bucket 15 to enable product to fall from the holding bucket into the container 21. Thus, product 13 starts falling out of the container 20 at substantially the same time product starts falling into the container 21.

Although the clamshell 51 starts opening before the door 35 fully closes the container 21, the door catches the falling product as the door moves from right to left. The clamshell 51 is closed at approximately the same time the door 35 reaches a position fully closing the container 21. The succeeding cycle then begins and new weight signals are received and processed by the microprocessor 101. In order to reload the holding buckets 15, the microprocessor 101 activates the overhead supply 16 so as to deliver an approximate but not exact predetermined quantity of product 13 to the designated holding buckets 15.

The next dump cycle of the right-hand weighing bucket 17 then proceeds immediately if the bucket is included in the newly selected combination. Thus, the door 35 is shifted from left to right by the mechanism 38 to a position opening the container 21 and closing the container 20. At substantially the same time the door starts moving, the actuator 61 starts opening the clamshell 50 so that product begins falling into the container 20 as product begins falling out of the container 21. The clamshell 50 closes at about the same time the door fully closes the container 20.

In order to implement the control of the overhead supply 16, the reciprocating rods 41 and the actuators 61, the microprocessor 101 delivers control signals to these devices via the bi-directional bus 103 and the output port 109. Gross weight data for each of the N buckets is received by the microprocessor 101 via input port 107. Each of the N load cells 18 is associated with an amplifier 111 which receives the raw signal from the load cell 18, filters and amplifies the signal in order to prepare the signal for the analog-to-digital converter 113 (hereinafter referred to as A/D converter). In the A/D converter 113, the analog signal is converted to a digital signal compatible with the microprocessor 101. The A/D converter 113 converts the gross weight signals to a digital format, and delivers them to the microprocessor 101 by way of input port 107 and bi-directional bus 103.

Once the microprocessor 101 has received the measured gross weights corresponding to the respective N buckets, digital signals stored in the memory 105 and corresponding to the tare weights for each of the N buckets are subtracted from the gross weight signals from the respective buckets in order to provide net weight signals which reflect the weight of the product held in the buckets 17. Once the combination of M net weights closest to the target weight is determined, the microprocessor 101 provides dump signals to the several buckets in the selected combination via the output port 109 by way of the bi-directional bus 103. These dump signals are converted by opto-isolators 115, or like devices, to analog voltages which activate the movement of the actuators 61, reciprocating rods 41 and the overhead supply 17. In response to the appropriate dump signals from the microprocessor 101, the M selected buckets 17 holding the product corresponding to the best weight combination are dumped into the funnel 14.

Preferably, the foregoing sequence of weighing, finding the best combination, dumping and filling is continuously repeated. Unfortunately, the weighing apparatus 10 must be occasionally stopped to replace load cells, weighing buckets or other worn parts. As indicated above, replacement of some parts such as the load cells 18 may cause the electrical signal indicative of tare weight to change dramatically. Updated the memory 105 with the new value for the tare weight will provide the necessary adjustment, but the new tare weight may now represent a significant portion of the range of digital weight values received from the A/D converter 113.

For example, if one of the amplifiers 111 has an output of 1.56 millivolts when its associated weighing bucket 17 is empty, the A/D converter 113 is preferably set for a digital output of 64. Replacement of the load cell 18 may cause the analog tare weight voltage from the amplifier 111 to increase substantial, such as to one volt. Since the A/D converter 113 responds to an analog input over the range of zero to five volts, the new load cell 18 allows the amplifier 111 and A/D converter 113 to only have 80% of its range available to measure net weight (assuming that five volts of input to the A/D converter 113 gives a near maximum digital value). In contrast, the old load cell 18 used less than one percent of the range of amplifier 111 for the tare weight, thus leaving more than 99 percent of the range available for measuring net weight. An almost 20% reduction in range translates into a significant reduction is resolution and, as a result, lost weight accuracy. Of course, when parts such as the load cells 18 are replaced, the associated amplifier 111 can be recalibrated in order to insure the analog tare weight voltage stays within an acceptable range. But valuable packaging time is lost since the whole system is shut down to recalibrate just one amplifier.

In accordance with one important aspect of the invention, the amplifiers 111 are automatically calibrated during start up of the weighing apparatus 10. By automatically calibrating the apparatus 10, the analog voltages from the amplifiers 111 which are representative of the tare weights for the buckets are brought close to a predetermined value in order to ensure the A/D converter 113 has adequate range to provide a high degree of resolution and resulting weight accuracy. Specifically, the microprocessor 101 first presets at midrange a variable gain for each of the amplifiers 111, and then examines the digital tare weight values of each of the buckets 17 received from the A/D converter 113 (during calibration all the buckets are empty). By adjusting the gain of the amplifiers 111, these digital values are adjusted by the microprocessor 101 in accordance with a programmed algorithm to bring the actual tare weight value close to an ideal tare weight value. If the gain adjustments of the amplifiers 111 reach their endpoints and the tare weight values are not within a predetermined range including the ideal tare weight value, the microprocessor 101 signals the operator by way of a conventional audio/visual alarm 108 that an error has occurred and the appropriate bucket should be investigated. Otherwise, the microprocessor 101 places the digital value of the adjusted tare weight in the memory 105.

In response to a determination by the microprocessor 101 that the tare weight of one of the pairs of load cells 18 and amplifiers 111 has a response for an empty bucket that is not close to the predetermined ideal analog response, a digital correction signal is delivered from the microprocessor 101 to all of the amplifiers by way of bi-directional bus 103, output port 115 and bus 117. After the bus 117 delivers the digital correction signal to all of the amplifiers 111, the microprocessor 101 generates an address signal so the appropriate one of the amplifiers latches the correction signal. Specifically, the address signal is delivered to an address decoder 119 which provides a strobe signal to the appropriate amplifier 111. The digital signal received by the designated amplifier 111 causes the gain of the amplifier to change, thereby resulting in a change in the amplitude of the analog voltage output of the amplifier. With the analog voltage changed, the A/D converter 113 responds by correspondingly changing its digital output.

Because the average amplitude of weight signal ($V_{TW}$ in FIG. 4) from an amplifier 111 will vary with target weight, it may occur that for light weight items to be packaged, the analog voltage from the amplifiers 111 rarely exceed a voltage such as two or three volts. If the A/D converter 113 is set to give a full value digital response for a five volt input, then operation of the amplifier 111 in the zero to three volt range causes the A/D converter to use less than its maximum resolution ability. Specifically, the binary combinations of bits corresponding to the range three to five volts are unused.

In accordance with another important aspect of the invention, the gain of the A/D converter 113 is automatically adjusted in response to the selection of a package target weight so that the full range of the output of the A/D converter 113 is utilized regardless of the voltage range of the analog input from the amplifiers 111. Specifically, the microprocessor 101 adjusts the gain of the A/D converter 113 during start up or calibration of the system so that the full range of the A/D converter 113 is used regardless of whether the apparatus 10 is weighing whole potatoes or potato chips. In the case of whole potatoes, the target weight may be 10 pounds. Accordingly, electrical output from the load cells 18 and amplifiers 111 may vary from zero to $V_{MAX}$ in FIG. 4 (the full range of the amplifiers). In contrast, the target weight for a bag of potato chips may be just 12 ounces and therefore the analog voltage from each load cell 18 and amplifier 111 pair may vary only from zero to one volt. Without adjustment, the A/D converter 113 would be using less than its full digital range for weighing potato chips. As a result of this reduced range, the resolution of the apparatus 10 is reduced and the accuracy of the measured weight suffers. By adjusting the gain of the A/D converter 113 in response to a change in target weight, the weighing apparatus 10 is calibrated to provide the greatest possible weighing accuracy.

In order to adjust the gain of the A/D converter 113, the microprocessor 101 determines from an input source 120 the current target weight value. Typically, the target weight is manually set into the system using conventional circuitry such as thumbwheel switches. From the target weight value, the appropriate gain of A/D converter 113 is determined by the microprocessor 101, and a digital signal indicative thereof is delivered to the A/D converter via output port 109 and bus lines 103 and 121. The A/D converter 113 may be a commercially available converter having programmable gain.

After the weighing apparatus has been calibrated as described, the cyclic repetition of the sequence of weighing, finding the best combination, dumping and filling is continuously repeated until either a predetermined count has occurred or until a predetermined time period has elapsed. When the microprocessor 101 senses either the predetermined count or the lapse of a predetermined time period from an internal counter or timer A of the microprocessor 101, the succession of weighing cycles is interrupted; instead of simultaneously filling the second compartment of the M selected buckets 17 as the first compartment is dumped, the corresponding holding buckets 15 are not opened by the actuators 61 and therefore the M buckets which were dumped in the weighing cycle are not refilled with product. Since the M buckets 17 just dumped are not refilled, their weight signals received by the microprocessor 101 represent the tare weights of the buckets.

In keeping with the invention, the tare weights are updated in substantially the same manner as they were calibrated. Specifically, the microprocessor 101 reads the digital value from the A/D converter 113 for each empty bucket 17. If the digital tare weight value has drifted from the ideal digital value, then the microprocessor adjusts the offset of the associated amplifier 111 to bring the digital tare weight value back to the ideal value. If the amplifier offset is adjusted to one of its limits and the digital value is beyond a predetermined range of values, the microprocessor 101 alerts the operator of a system fault.

After the tare weight for each of the M buckets 17 has been examined and, if necessary, updated, the M buckets are then refilled by activation of the appropriate actuators 61 which open the appropriate holding buckets 15 to fill the empty compartments of the buckets which are closed by doors 35. The system then returns the weighing apparatus 10 to the normal weighing cycle mode which will continue to repeat until the internal counter or timer A again indicates that a tare cycle should be executed.

Figure 3:
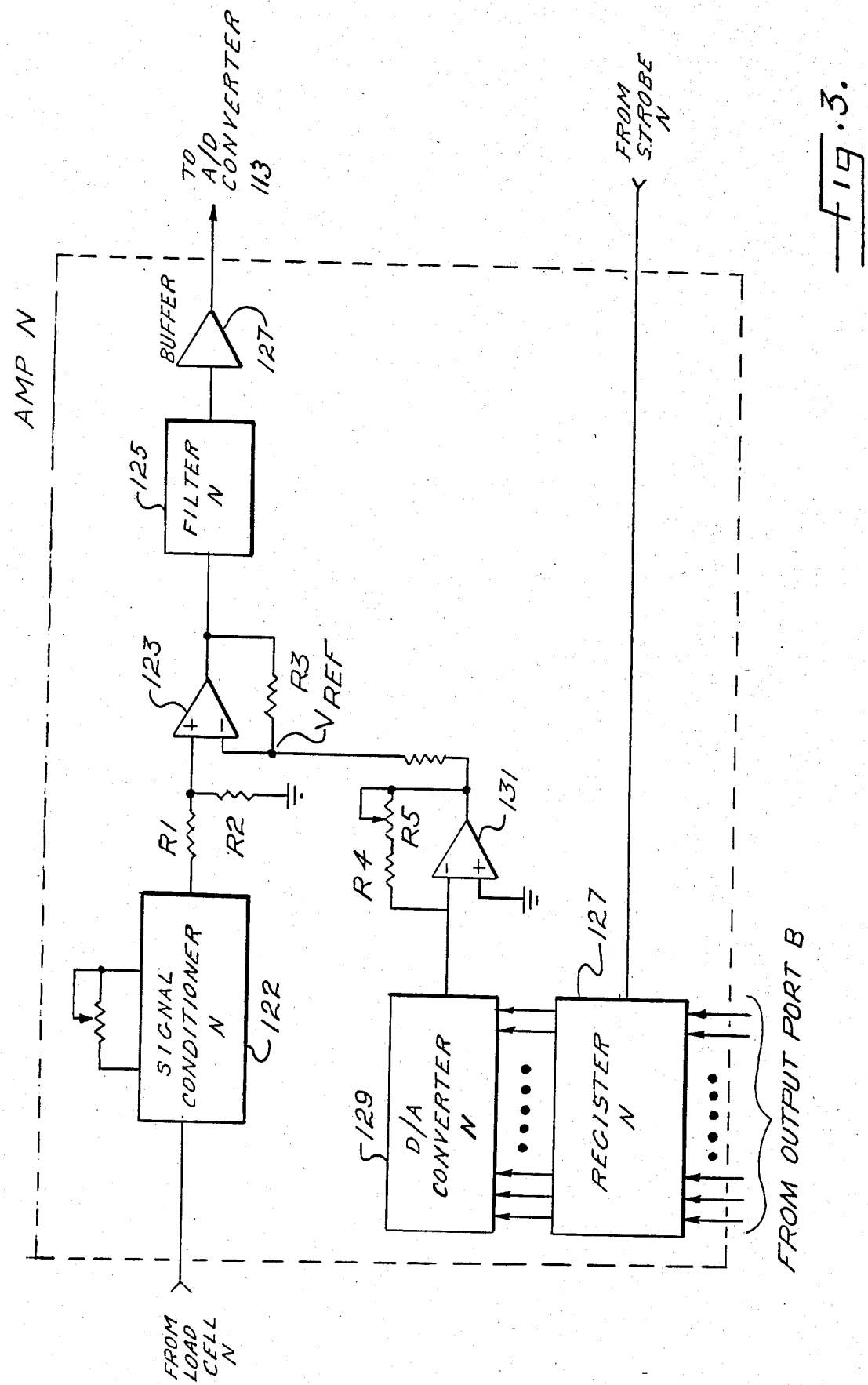
FIG. 3 is a block diagram of one of the amplifier and signal conditioners included in the system of FIG. 2.

Referring now to FIG. 3, the signal conditioner 121 in each of the amplifiers 111 receives a raw analog weight signal from an associated load cell 18. The signal conditioner 122 may be a model 2B31 signal conditioner manufactured by Analog Devices. Amplification of the conditioned signal from the signal conditioner 122 is provided by operational amplifier 123 in coordination with resistors R1, R2 and R3. Before the conditioned and amplified weight signal from the load cell 18 is delivered to the A/D converter 113, it passes through a low-pass filter 125 and buffer 127.

During installation of the apparatus 10 and its associated electronics, each of the registers 127 is set at midpoint of its range. The offset level provided by the signal conditioner 121 of each amplifier 111 is manually adjusted by variable resistance R6 to provide an initial analog tare weight signal approximately equal to a voltage level $V_{IDEAL}$ in FIG. 4. In order to equate voltage with weight, 200 grams is added to each bucket, and the voltage from each bucket is subtracted from the tare weight voltage. The resulting net voltage is placed in memory to provide the necessary second voltage point reading necessary to allow conversion of the measured voltage to a weight in grams during normal operation.

When the system 100 is shut down for maintenance such as replacement of a worn load cell 18, each of the tare weights is calibrated in accordance with the invention upon start up in order to insure the analog tare weight is maintained close to $V_{IDEAL}$. If the replacement of an old load cell 18 results in an analog tare weight different from $V_{IDEAL}$, the microprocessor 101 adjusts the offset voltage at the negative input of the operational amplifier 123, thereby changing the reference voltage level of the analog weight signal to a value close to $V_{IDEAL}$. To accomplish this, a digital correction signal from the microprocessor 101 is written into a register 127 by the strobe signal from the address decoder 119. From the register 127, the digital correction signal is delivered to a D/A converter 129 wherein the digital signal is converted to an analog voltage. This analog voltage is amplified by operational amplifier 131 and resistor R4 and adjustable resistor R5. The amplified voltage provides a reference voltage $V_{ref}$ for the negative input of operational amplifier 123. By controlling the level of the voltage $V_{ref}$, the offset voltage of the amplifier 123 can be controlled, thereby controlling the analog tare weight voltage. If the digital value entered into a register 127 is either a high or low value and the analog tare weight remains outside the limits $V_H$ and $V_L$ in FIG. 4, the microprocessor 101 alerts the system operator of a system fault.

By adjusting the value of resistor R5, the gain of operational amplifier 131 can be controlled so as to allow for adjustment of the amount of change in the analog tare weight voltage for every bit change in the digital signal written into register 127. With and 8-bit register 127 and a 12-bit A/D converter 113, the gain of operational amplifier 131 is preferably set so that incrementing register 127 by one bit will cause the output of A/D converter 113 to increment 8 bits. This relationship allows for the easiest binary computations by the microprocessor 101 for updating the digital value stored in the registers 127.

In order for the microprocessor-based system 100 to operate, it is programmed to execute iterations of a stored program (held in memory 105) and made up of the steps illustrated in the flowcharts of FIGS. 5a, 5b, 6, 7a and 7b.

Figure 5A:
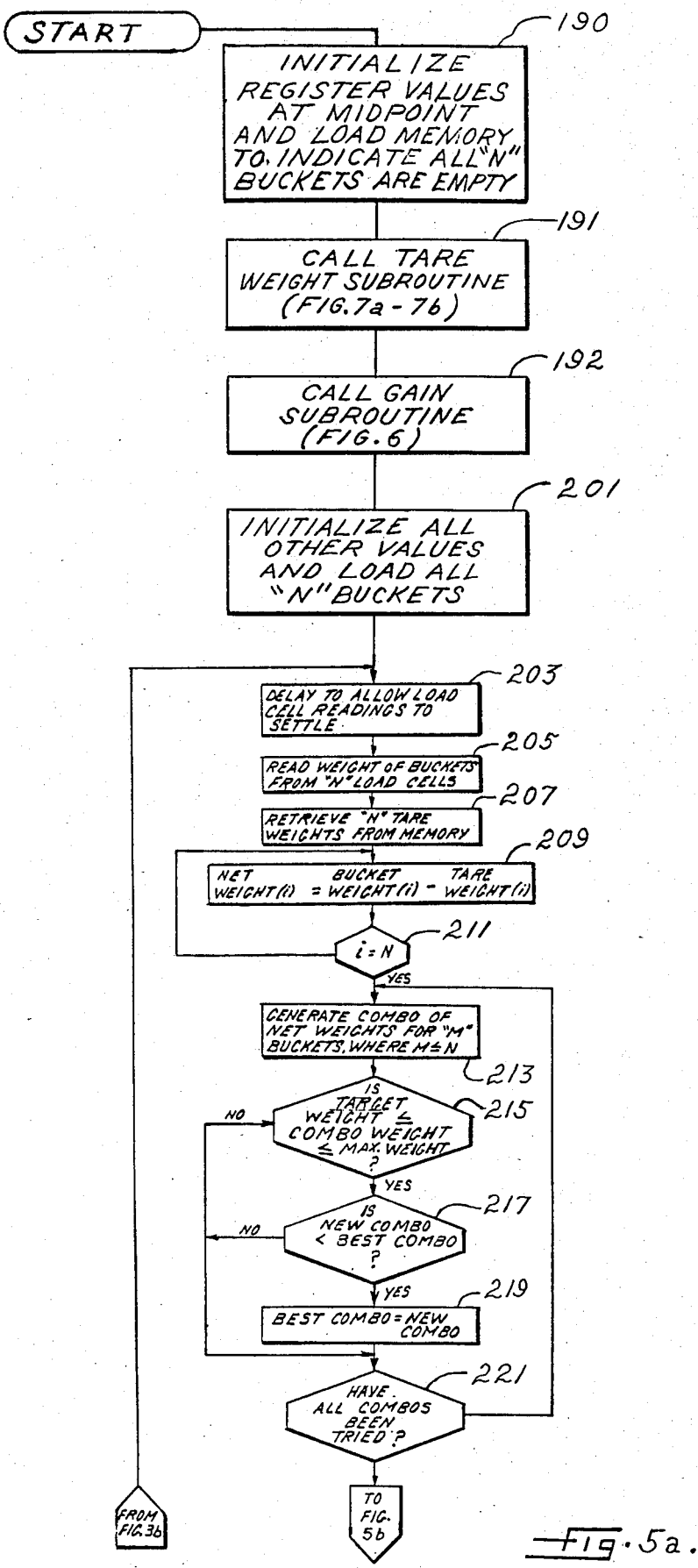
FIGS. 5a and 5b are flowchart diagrams for the programming of the microprocessor-based system of FIG. 2 to perform the tasks of finding the best weight combination and periodically updating the tare weight values.
Figure 5B:
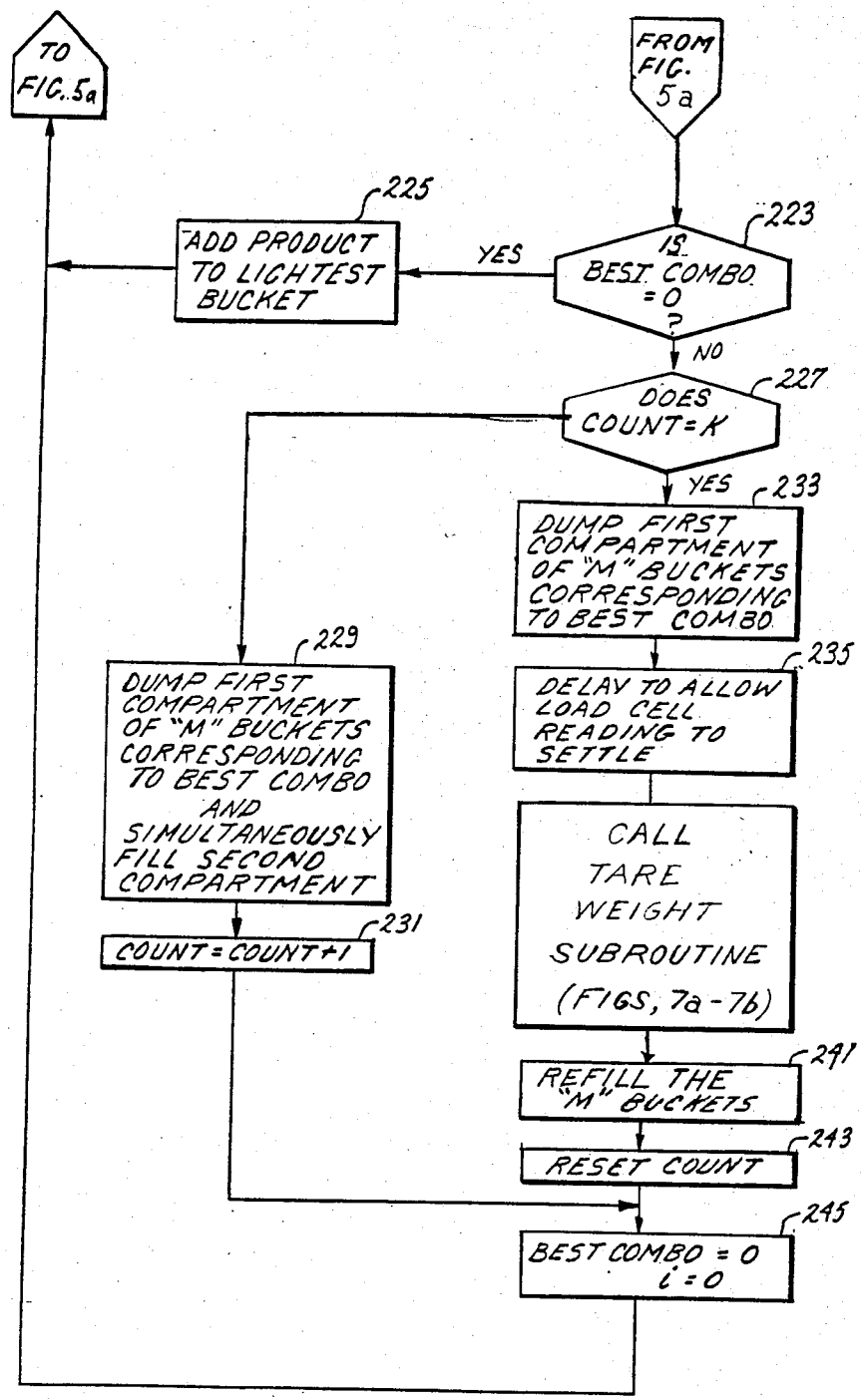

In keeping with the invention, the registers 127 are initialized at their midpoints in step 190 of FIG. 5a. In order for all the buckets 17 to be calibrated during start up, the program memory is set to indicate all N buckets 17 were emptied during a last weighing cycle. The presetting of the number of empty buckets 17 at a value N primes the system for executing the Tare Weight Subroutine of FIGS. 7a and 7b, called at step 191, so that all of the buckets are calibrated during start up. Once the analog tare weight is calibrated to a value close to $V_{IDEAL}$, the program then executes the Gain Subroutine of FIG. 6 at step 192. Finally, before entering a weighing cycle, all other values are initialized in step 201 and all N buckets 17 are loaded.

In step 201, the system values are initialized and one of the compartments 20 or 21 of each of the N buckets 17 is loaded in order to prime the weighing apparatus 10. To allow sufficient time for the dissipation of transients such as vibrations from the loading of product into the buckets 17, a time delay is inserted at step 203 between the loading of product and the reading of the signals from the load cells 18 by the microprocessor 101. In step 205, the microprocessor 101 receives binary data by way of the A/D converter 113 which corresponds to the gross weights of the buckets 17 as measured by the analog signals of the load cells 18. Stored in an array format in memory 105 are tare weights for each of the buckets 17. By subtracting the data for tare weight from the data for gross weight in steps 207, 209 and 211, the microprocessor 101 generates data for each bucket which corresponds to a net weight or a product weight. In a conventional manner, an internal counter B is used in steps 209 and 211 for identifying the tare weight data cell in the array which corresponds to a particular bucket.

From the net weight data for each of the buckets 17, the program begins a sequence, illustrated in step 213, of combining M net weights in every possible combination where M is less than or equal to N.

In step 215, the predetermined target weight and the predetermined maximum weight stored in memory 105 are compared to the total weight found from the combination of net weights of the selected combination. If the target weight is less than or equal to the combination weight and if the combination weight is less than or equal to the maximum weight, then the combination is a possibility for packaging. In order to insure that the combination within the range selected in step 215 is the best combination (i.e., closest to the target weight), step 217 compares the weight of the new combination with the weight of the last combination which was also within the minimum and maximum limits. Of course, if this is the first combination chosen in a cycle, the previous best combination is zero and the new combination is the best by default.

If it is found in step 217 that the total weight of the net weights from the selected combination of M buckets 17 is closer to the target weight than the weight of a previous acceptable combination, then the most recent combination replaces the previous combination as the best combination in step 219. If the total weight of the present combination either is not within the limits set up in step 215 or is not less than the previous best weight combination, the program will bypass the step wherein the present combination replaces the previous best combination, and the program proceeds to step 221 wherein the combinations are checked to determine if any combinations remain to be tried. If more combinations exist, the program returns to step 213 wherein a new combination is generated, and its total net weight is checked in steps 215 and 217.

Once all the combinations of net weights have been tested, the program checks in step 223 to determine if at least one combination was found to be within the range set out in step 215. If no combination has been found to be within the range, then the computer 101 commands the holding bucket 15 to add product to the lightest bucket 17 in step 225.

If an internal count kept by the counter A of the microprocessor 101 reaches a value K in step 227, the program bypasses the ordinary weighing cycle steps 229 and 231 in order to update the tare weights of the buckets chosen as having the best combination in the present weighing cycle. In step 233, the compartments of the M buckets comprising the best net weight combination are dumped, but the actuators 61 are not commanded by the microprocessor 101 to open the corresponding holding buckets 15; therefore, the buckets 17 which are emptied in step 233 are not refilled. In step 235, the microprocessor 101 causes the system to delay further execution in order that transients in the output signals from the load cells 18 caused by vibrations of the weighing apparatus and the like during the dumping of product can be dissipated before proceeding.

Figure 7A:
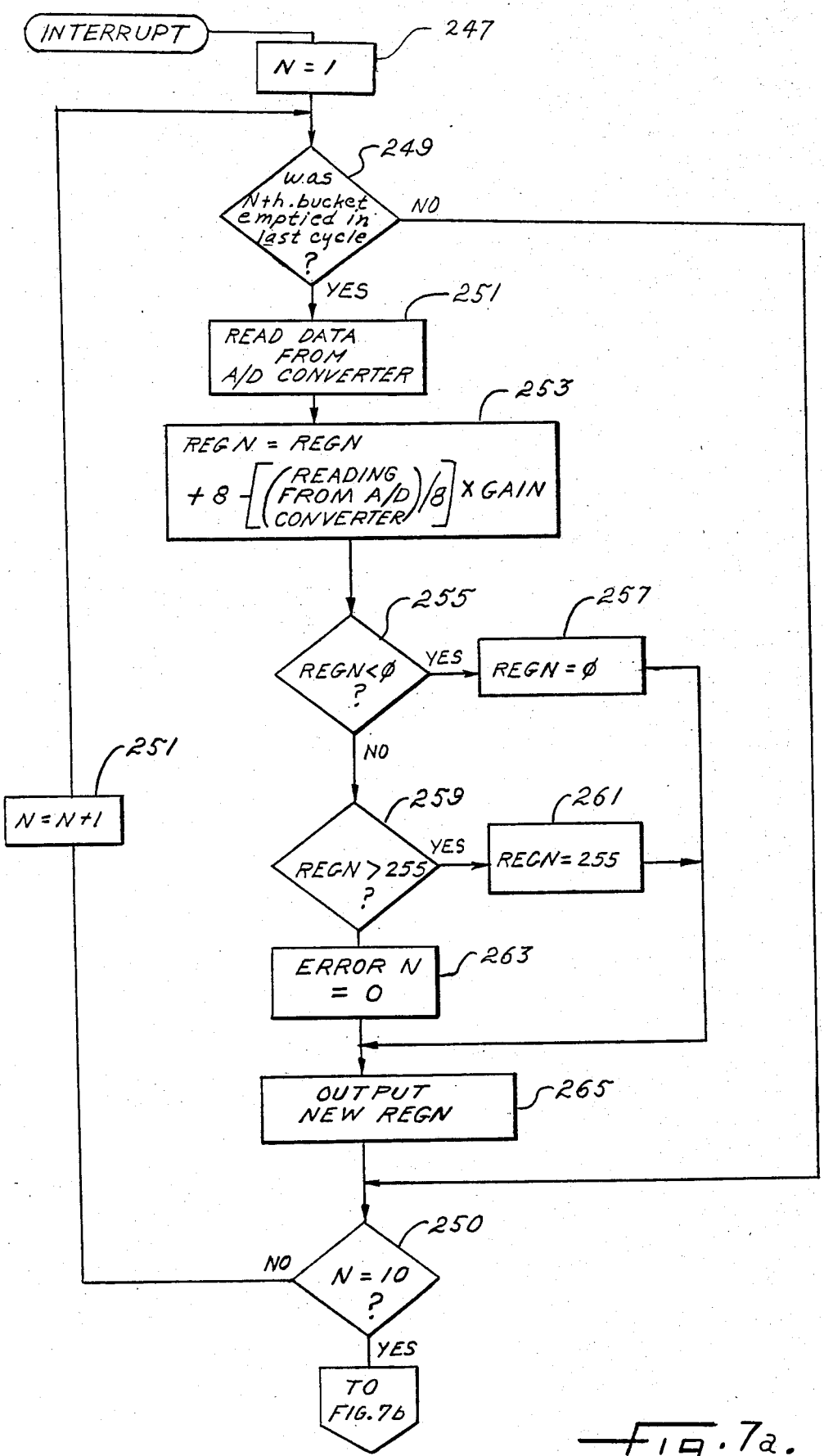
FIGS. 7a and 7b are flowchart diagrams for a subroutine in accordance with the invention which is executed from the main program set forth in the flowchart diagrams of FIGS. 5a and 5b.
Figure 7B:
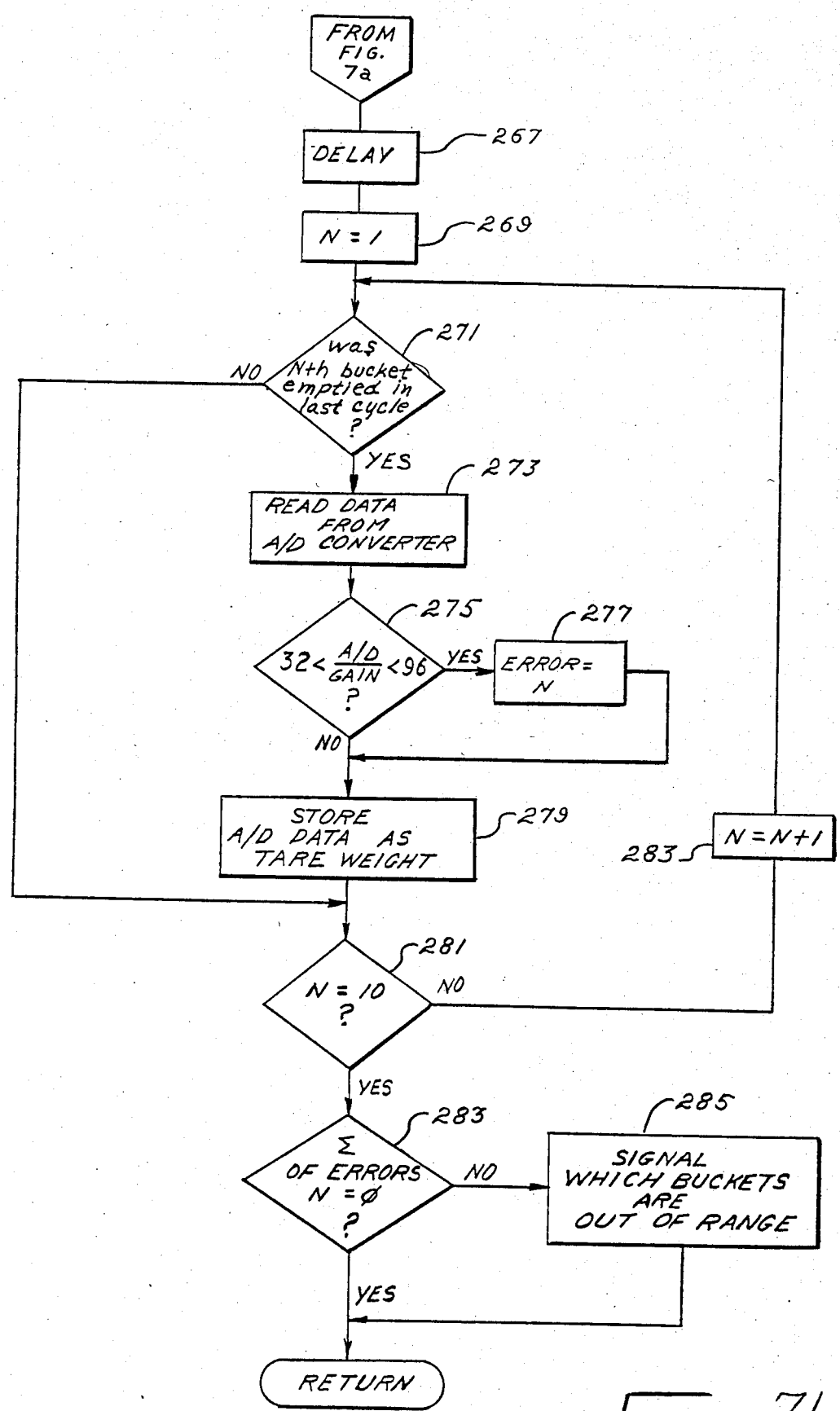

After the transients have had sufficient time to dissipate, the microprocessor 101 executes the subroutine of FIGS. 7a and 7b for adjusting the analog signals eminating from the load cells 18 of the empty buckets 17 if the microprocessor senses the digital tare weight signal of any bucket has drifted from an ideal value corresponding to the ideal analog tare weight, $V_{IDEAL}$ for tare weight. The microprocessor 101 then stores these new tare weights inside of the memory 105 at the appropriate locations of the tare weight array.

In step 241, the microprocessor 101 commands the appropriate holding buckets 15 to refill the M buckets chosen by the microprocessor in the last calculation of a best combination. From step 241, the count K of internal counter A is reset to zero in step 243 and the tare weight cycle then returns the weighing apparatus 10 to step 245 which prepares the apparatus for entry into a new weighing cycle.

Referring back to step 227, if the internal counter A of the microprocessor 101 has not reached the count of K, then the weighing cycle is executed in step 229 wherein the product is dumped from the first compartment of the M selected buckets 17 and the corresponding holding buckets 15 simultaneously fill the second compartment. Of course, in order to update the internal counter A, the count is incremented in step 231. Before beginning a new cycle, house cleaning chores are executed in step 245 by resetting the best combination and the incremental value i of the internal counter B.

Because of severe product buildup in the buckets 17 for some items (e.g., frozen fish or frosted donuts) and because it is statistically possible (but highly unlikely) that a particular bucket may not be tared for a long period of time, it may prove necessary to force a particular bucket to be one of the buckets chosen in the next tare cycle. To accomplish the forcing of a particular bucket into the group of M buckets to be tared in the next tare cycle, each bucket 17 may have assigned to it a memory timer (not shown) which is reset when the bucket is chosen for a tare cycle. If the timer for a bucket 17 times out before that bucket is selected in a tare cycle, the microprocessor-based system 100 reacts to the time out by preselecting the bucket as one of the M buckets to be included in the next tare cycle. Since the statistical chances are very small that a particular bucket 17 will be missed for a sufficiently long period of time to cause a significant change in the tare weight, only the most troublesome products matched with a marginal tare weight cycle intervals should require this additional program feature.

Figure 6:
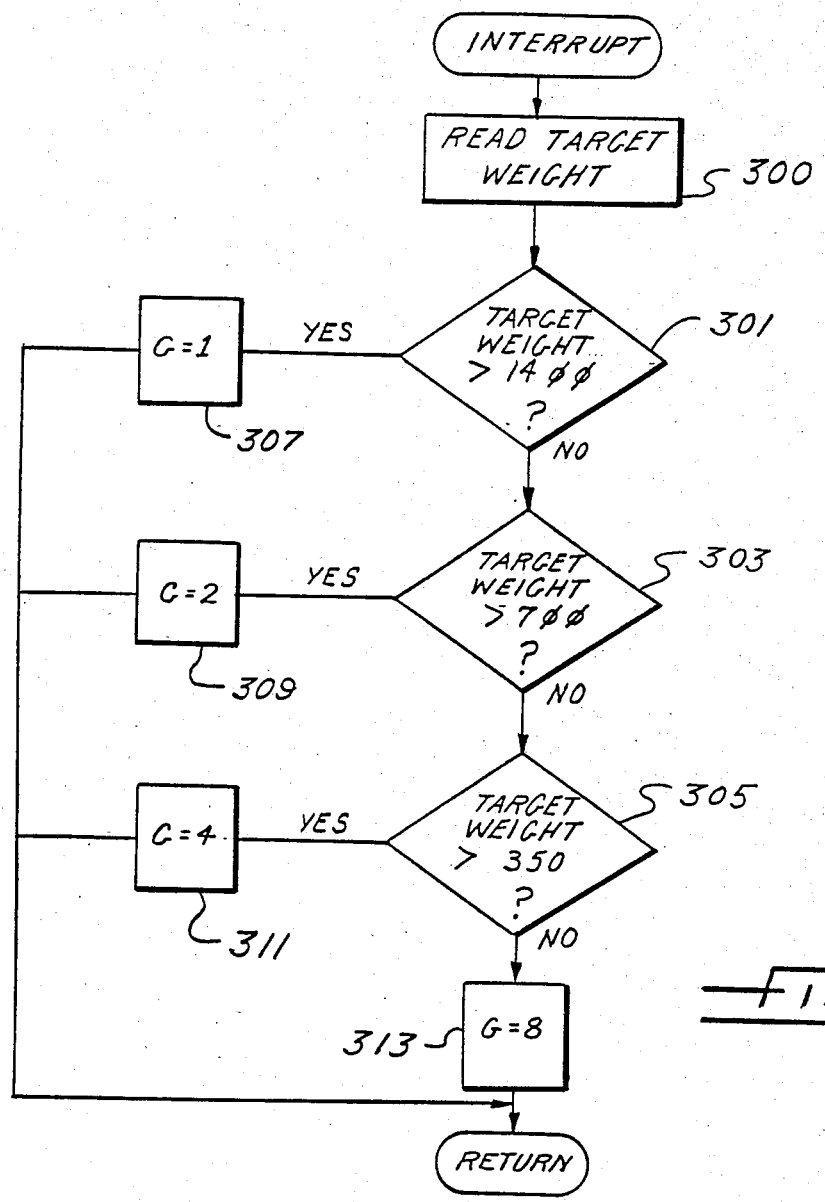
FIG. 6 is a flowchart diagram for a subroutine in accordance with the invention which is executed from the main program set forth in the flowchart diagrams of FIGS. 5a and 5b.

In the Gain Subroutine of FIG. 6, the target weight is first read from the input 120 (FIG. 2) in step 300. In a sequence of steps 301, 303 and 305, the target weight is compared against progressively smaller weights to determine the amount of gain necessary for the A/D converter 113 to function over its full available range. The particular values in steps 301, 303 and 305 are in the units of grams. The relationship of target weight and gain of the A/D converter 113 is determined empirically; therefore, the values in steps 301, 303 and 305 are merely illustrative. For example, if the target weight is relatively great, such as greater than 1400 grams in step 301, the program branches to step 307 where the gain of the A/D converter 113 is set to one. For a target weight greater than 700 grams but less than 1400 grams, the gain is set to two in step 309. For a weight greater than 350 grams but less than 700 grams, the gain is set to four in step 311; otherwise, the gain is set to eight in step 313.

Figure 4:
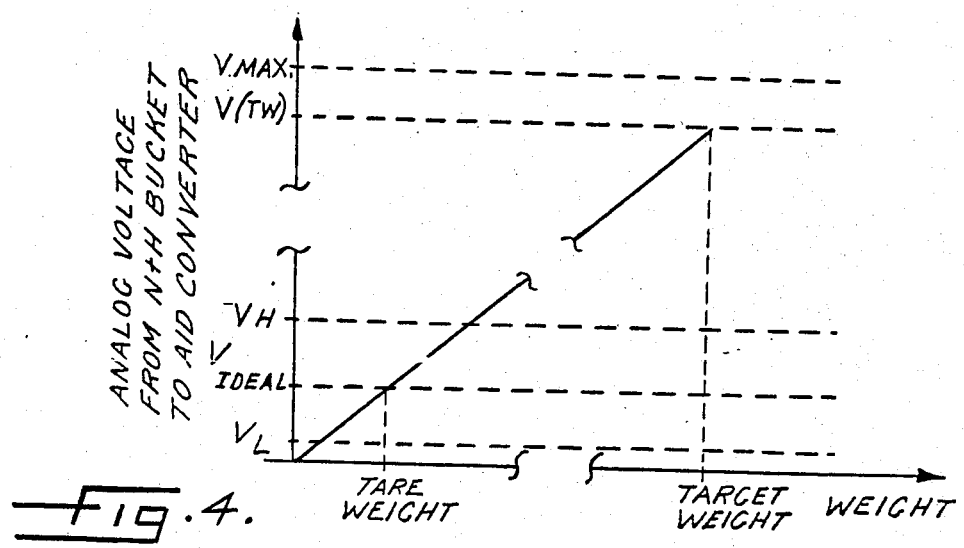
FIG. 4 is a foreshortened graph depicting the linear relationship between the actual total weight of a weighing bucket and the analog voltage generated by an associated load cell and amplifier, and specifically illustrating an ideal analog voltage, $V_{IDEAL}$, for the tare weight of the weighing bucket having upper and lower limits, $V_H$ and $V_L$ respectively, within which the tare weight voltage may safely vary from $V_{IDEAL}$ without serious degradation of weight resolution.

In the tare subroutine of FIGS. 7a and 7b, each bucket is first investigated to determine if it was dumped in the last weighing cycle and is therefore empty. If the bucket is empty, the tare weight is updated in accordance with the invention. If the analog tare weight signal from an amplifier 111 cannot be brought within the range $V_H$ to $V_L$ as illustrated in FIG. 4, the operator is notified so that appropriate action may be taken. Step 247 initializes the number N which is used to identify the current bucket under investigation in the steps which follow.

If it is determined in step 249 that the current bucket N is not empty the program branches to step 250 where the bucket number N is checked to determine if the current bucket under investigation is the last bucket (in this case, bucket number 10). If this is not the last bucket 17, the number N is incremented in steps 251, and the test of steps 249 is repeated. If the bucket is found to have been emptied in the last weighing cycle, the program branches to step 252 where the microprocessor 101 read the digital data from the A/D converter 113 representing the weight of the current bucket under investigation.

In keeping with the invention, in step 253 the computer 101 analyzes the digital data from the A/D converter 113 which represents the weight of the current bucket under investigation to determine if the tare weight signal requires adjustment. Specifically, for a register 127 having eight bits and a A/D converter 113 having 12 bits, the algorithm for updating the digital value in the register is preferably as follows:

$$\text{NEW REGISTER VALUE} = \text{OLD REGISTER VALUE} + 8 \quad \frac{-A/D \text{ VALUE}}{8} \times (\text{GAIN of } A/D) \quad (1)$$

where "OLD REGISTER VALUE" is the current digital value entered into the register 127, "A/D VALUE" is the digital value from the A/D converter 113 and "GAIN of A/D" is gain of the A/D converter determined by the Gain Subroutine of FIG. 6.

Since each of the registers 127 is a 8-bit register and the A/D converter is 12 bits, a factor of eight is used in equation (1) to relate the register and converter values. Because the operational amplifier 131 is adjusted such that a single bit change in a register 127 causes the A/D converter 113 to increment eight bits, a value of eight is added in equation (1) to the old register value.

For example, in a system where the gain of the A/D converter 113 has been programmed to be one, the system is preferably calibrated for the A/D converter to have a digital tare weight value of 64 for the analog voltage $V_{IDEAL}$. Since eight bits of change in the A/D converter 113 correspond to a change of one bit in a register 127, the equation (1) provides for a new value for the register only when the output of the A/D converter has drifted more than eight bits. The integer value derived from the term "A/D VALUE"/8, is the operative value in equation (1) since fractional changes of the term represent fractions of a bit in registers 127.

Ordinarily, the digital tare weight output of the A/D converter 113 can be held to a value of 64 plus or minus 8. If continued adjustment of the tare weight results in the register 127 reaching one of its limits, the digital tare weight signal from the A/D converter 113 may go as high as 96 (corresponding to the analog voltage $V_H$ in FIG. 4) or as low as 32 ($V_L$ in FIG. 4) before the operator is notified. If the value of the tare weight becomes to great, resolution is significantly affected as indicated above. If the value of the tare weight goes too low, then there is a significant risk the bucket 17 is not correctly transferring its entire weight to the associated load cell 18, and, therefore, the weight measurements made during the weighing cycle may be inaccurate. More important, an analog tare weight value which is negative is not correctly interpreted by the A/D converter. To avoid a negative tare weight, the voltage $V_L$ is set at a value somewhat greater than zero.

Moreover, since each of the registers 127 were initially set at a midpoint in their range, the inability of the register to pull the tare weight value back into an acceptable range indicates the register is at one of its limits. This much movement coupled with the fact that the weight is now out of range, gives rise to the substantial risk that the bucket 17 and its associated electronics, have malfunctioned.

If the new value for the register 127 is out of range, steps 255, 257, 259 and 261 reset the value to either its maximum or minimum limit. If the new value of register 127 is within range, an error flag is set to zero in an array having the same number of cells as there are buckets. The error flags in this array are used to identify the buckets 17 which are malfunctioning.

Once the new value for a register 127 is set, it is written into the register at step 265. If it is determined in step 250 that the current bucket is not the last bucket (e.g., the tenth bucket), the foregoing steps 249-265 are repeated for the next bucket.

Referring now to step 267 in FIG. 7b, the program delays a small time period in order for the analog voltages and digital signals affected by the new values placed in the registers 127 to settle. Because each bucket 17 is again checked to determine if it was emptied during the last weighing cycle, the value N—used to identify a particular bucket—is initialized at a value of one in step 269.

If in step 271, the Nth bucket 17 is determined to have been emptied in the last weighing cycle, the digital data from the A/D converter 113 is read by the computer 101 at step 273. If after adjustment of the tare weight value in steps 251-265, the digital value of the tare weight is still beyond the limits $V_H$ or $V_L$ (a digital 32 or 96, respectively) as determined in step 275, then step 275 sets an error flag in the array mentioned in connection with step 263. Otherwise, the new tare weight value is within range and its digital value is stored within memory 105 in step 279. If the current bucket under investigation is not the last bucket (e.g., the tenth bucket), then the program branches from step 281 back to step 271. Step 283 increments the number N so that the next bucket is examined.

After all the buckets have been investigated, the program brances from step 281 to step 283 wherein all the array containing the error flags is checked to determine if any of the flags have been set. If a flag has been set, thereby indicating an out-of-range tare weight, the program branches to step 285 wherein the operator is visually and/or audibly signaled that the bucket associated with the out-of-range tare weight should be investigated. From either step 283 or step 285, the subroutine returns to the main program of FIGS. 5a and 5b.

From the foregoing, it will be apparent that the present invention brings to the art a new and improved apparatus and method for calibrating a computerized weighing system so as to maintain the resolution ability of the system at a high level during normal operation. Because of the increased accuracy afforded by the apparatus and method of the invention, there is a reduction of the average excess product weight in each package. Over many cycles, this savings of products becomes substantial and represents a significant monetary savings.

I claim:

1. An apparatus for calibrating voltages corresponding to measured weight in an automatic combination weighing machine so as to provide a tare weight voltage which does not consume a significant portion of the range of voltages for indicating total measured weight, said apparatus comprising:
 a bucket for holding product to be weighed;
 weighing means for providing an electrical signal indicative of the combined weight of bucket and product;
 computer means having
  (a) means to identify which buckets are empty;
  (b) means for determining if an electrical signal from said weighing means is within a first predetermined range of an ideal value indicative of tare weight; and
  (c) means for adjusting the signal from said weighing means in response to an indication from means (b) that the signal is outside said predetermined range and an indication from means (a) that the signal is indicative of tare weight.

2. An apparatus as set forth in claim 1 wherein said weighing means includes an analog-to-digital converter having a variable gain and said computer means includes means (d) for adjusting the gain of said analog-to-digital converter in response to changes in the target weight for a packaged product.

3. An apparatus as set forth in claim 1 wherein said weighing means includes:
 a transducer for providing a variable voltage in response to the weight of said bucket;
 an adjustable amplifier for receiving said variable voltage from said transducer, and
 an analog-to-digital converter for receiving an analog voltage from said adjustable amplifier and delivering said electrical signal to said computer means in the form of a digital signal.

4. An apparatus as set forth in claim 3 wherein said means (c) adjusts the level of the output voltage of said adjustable amplifier in accordance with an algorithm in order to bring the digital signal from said analog-to-digital converter close to said ideal value.

5. An apparatus as set forth in claim 4 wherein said adjustable amplifier includes:
 an analog amplifier which receives the analog voltage from said tranducer; and
 a digital-to-analog converter for receiving digital signals from said means (c) of said computer means and in response to said received digital signals provides an analog signal to adjust the offset voltage of said analog amplifier.

6. An apparatus as set forth in claim 5 wherein said computer uses the following algorithm to calculate an adjustment for said adjustable amplifier if the digital signal from said analog-to-digital converter is outside of said first predetermined range:
 NEW ADJUSTMENT=OLD ADJUSTMENT+8−AD/8×GAIN
where the NEW ADJUSTMENT is the digital value to be received by the digital-to-analog converter, OLD ADJUSTMENT is the previous value held by the digital-to-analog converter, GAIN is the gain of the analog-to-digital converter and AD is the digital value from the analog-to-digital converter.

7. An apparatus as set forth in claim 1 wherein said means (c) has upper and lower adjustment limits and said computer means includes means (d) for determining if said electrical signal is beyond a second predetermined range of said ideal value when means (b) requests an adjustment from means (c) which is beyond its adjustment limits.

8. An apparatus as set forth in claim 1 wherein said computer means includes means (d) for determining if the adjustment required by said means (c) to bring the electrical signal within said first predetermined range of said ideal value exceeds the adjustment limits of said means;
 means (e) responsive to means (d) for setting the adjustment value at one of its limits; and
 said means (b) determining whether the electrical signal is within a second predetermined range of said ideal value.

9. An apparatus as set forth in claim 8 including means (f) in said computer means for alerting an operator in response to said means (b) when the adjusted electric signal exceeds said second predetermined range.

10. A method of calibrating an automatic combination weighing machine which includes a processor means for receiving a plurality of signals from an analog voltage device via an analog-to-digital converter, wherein each of the signals is indicative of a tare weight of a bucket for holding product, said method comprising the steps of:
 (a) setting at midrange an adjustment for the output voltage of each of said analog voltage devices;
 (b) reading the digital signals from said analog-to-digital converter indicative of the tare weights for each empty bucket; and
 (c) adjusting the output voltages of said analog voltage devices if said digital signals are outside a range of values centered around an ideal value for the tare weight.

11. A method as set forth in claim 10 including the step of indicating a calibration error when the adjustment of said analog voltage devices cannot bring the digital signal within a second predetermined range of said ideal digital value wherein said second predetermined range is greater than said first predetermined range.

12. A method as set forth in claim 10 including the steps of:
 initiating weighing cycles of product;
 interrupting the weighing cycles and holding empty the buckets last dumped;
 repeating steps (b) and (c); and
 initiating weighing cycles of product.

13. A method as set forth in claim 10 including the steps of:
 determining the target weight for the packaged product; and
 adjusting the gain of the analog-to-digital converter so its full range is used in response to the range of analog voltages received by said analog voltage devices.

14. In an automatic weighing machine having a plurality of buckets for receiving quantities of product to be packaged, an apparatus for calibrating said weighing machine comprising:
 a device associated with each of said buckets for providing a weight signal whose characteristics are indicative of the total weight of said bucket and the product it holds;
 a processor means for receiving said signal and determining if said signal is associated with an empty bucket and therefore indicative of tare weight;

means (1) within said processor for determining if said signal for an empty bucket is within a first predetermined range of an ideal signal and generating a correction signal if said signal is outside said first predetermined range and therefore outside a predetermined range of tare weights; and means (2) for receiving said correction signal and adjusting said device in order to adjust the characteristics of said signal in order to provide a signal indicative of a tare weight within said first predetermined range.

15. An apparatus as set forth in claim 14 including:

means (3) for determining if said device has been adjusted to a limit;

means (4) responsive to an indication from means (3) that said device has been adjusted to its limit for determining if the adjusted weight signal is outside a second predetermined range which includes said first predetermined range; and means (5) responsive to means (4) for alerting the operator of the automatic weighing machine that the tare weight value for the bucket associated with said device has exceeded an acceptable range and said device cannot be further adjusted.

16. An apparatus as set forth in claim 14 wherein said device includes (a) an analog voltage device whose voltage amplitude is linearly proportional to the weight of said bucket and its contents, and (b) an analog-to-digital converter for converting said voltage amplitude into a digital signal for processing by said processor means; and said apparatus including:

means (3) for storing the target weight for a package of product, means (4) responsive to means (3) for adjusting the gain of said analog-to-digital converter so that extreme values in the range of digital values available from the analog-to-digital converter approximately correspond to the extreme values in the range of analog voltages anticipated from said analog voltage device in view of said target weight, thereby utilizing the full range of digital values and providing the highest possible resolution of the weight held by each bucket.

* * * * *